United States Patent
Hsiao et al.

(10) Patent No.: US 8,786,787 B2
(45) Date of Patent: Jul. 22, 2014

(54) PROJECTION ELECTRONIC BOOK

(75) Inventors: Po-Wen Hsiao, Hsinchu (TW);
Kai-Cheng Chuang, Tainan (TW);
Tzu-Ming Wang, Fongshan (TW);
Gwo-Feng Hwang, Jhudong Township, Hsinchu County (TW)

(73) Assignee: E Ink Holdings Inc., Hsinchu (TW)

( * ) Notice: Subject to any disclaimer, the term of this patent is extended or adjusted under 35 U.S.C. 154(b) by 468 days.

(21) Appl. No.: 12/847,495

(22) Filed: Jul. 30, 2010

(65) Prior Publication Data
US 2012/0026414 A1 Feb. 2, 2012

(51) Int. Cl.
*H04N 9/31* (2006.01)

(52) U.S. Cl.
USPC .......................................................... 348/744

(58) Field of Classification Search
USPC ................. 348/744, 790, 791, 552, 725, 553; 345/2.3, 173, 84, 87
See application file for complete search history.

(56) References Cited

U.S. PATENT DOCUMENTS

| | | | |
|---|---|---|---|
| 7,495,633 B2 * | 2/2009 | Oku et al. | 345/2.3 |
| 7,920,112 B2 * | 4/2011 | Kurihara et al. | 345/84 |
| 7,966,044 B2 * | 6/2011 | Hashimoto et al. | 455/566 |
| 8,199,117 B2 * | 6/2012 | Izadi et al. | 345/173 |
| 2003/0137496 A1 * | 7/2003 | Stevens et al. | 345/173 |
| 2007/0013873 A9 * | 1/2007 | Jacobson et al. | 353/30 |
| 2008/0247128 A1 * | 10/2008 | Khoo | 361/681 |
| 2008/0281851 A1 * | 11/2008 | Izadi et al. | 707/102 |
| 2010/0002151 A1 * | 1/2010 | Pan | 348/744 |
| 2012/0242609 A1 * | 9/2012 | Izadi et al. | 345/173 |

FOREIGN PATENT DOCUMENTS

| | | | |
|---|---|---|---|
| TW | 200910052 A | 3/2009 | |
| TW | 200923737 A | 6/2009 | |
| TW | 201001125 A | 1/2010 | |
| TW | 201001132 A | 1/2010 | |
| TW | 201011436 A | 3/2010 | |
| TW | I322920 B | 4/2010 | |

OTHER PUBLICATIONS

TW Office Action that these art references were cited.

* cited by examiner

*Primary Examiner* — Paulos M Natnael
(74) *Attorney, Agent, or Firm* — CKC & Partners Co., Ltd.

(57) ABSTRACT

A projection electronic book, having: an electronic paper device, used for displaying an image on an electronic paper panel according to an image information received via an electronic paper input port; a control unit, having an audio/video input port, a first display output port and a second display output port, the audio/video input port being used to receive a video information and/or an audio information, the video information being output via the first display output port or the second display output port, and the first display output port being coupled to the electronic paper input port; an audio/video storage unit, coupled to the audio/video input port to supply the video information and/or the audio information; and a micro projector, coupled to the second display output port for receiving the video information, being used to project an image according to the video information.

8 Claims, 1 Drawing Sheet

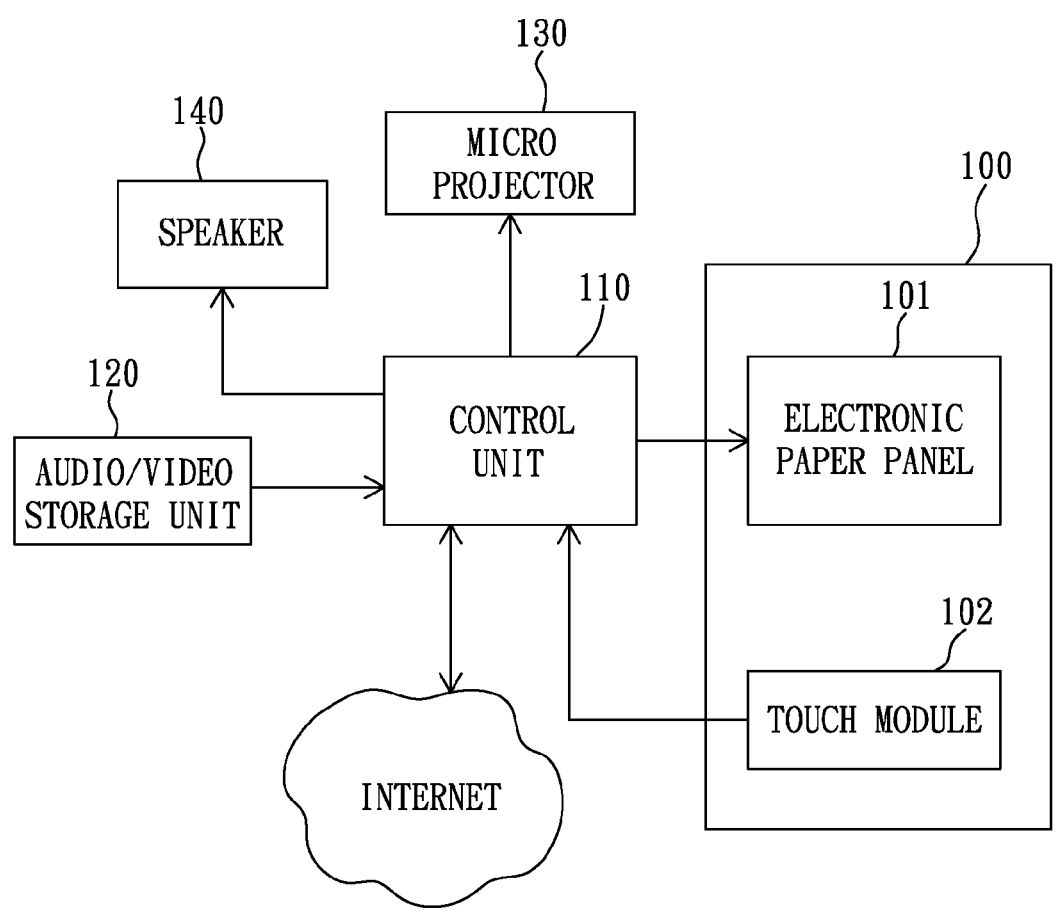

PROJECTION ELECTRONIC BOOK

BACKGROUND OF THE INVENTION

1. Field of the Invention

The present invention relates to an electronic book, especially to a projection electronic book with a reflective electronic book and a micro projector device integrated together to create functions that the reflective electronic books of prior art do not provide.

2. Description of the Related Art

As most present reflective displays are of small display size, the display content is therefore not able to be viewed by multiple persons simultaneously. Besides, the reflective displays can not play motion pictures due to long reaction time of their display layer—generally longer than 200 ms. Further, the display content of the reflective displays will be invisible when environmental lighting condition is deficient. What is more, people with poor vision can hardly read the display content of a small size display without the help of a magnifier even the environmental lighting is sufficient.

To conquer the mentioned disadvantages of the reflective displays, increasing the display size might be of help, but the problems about the image not visible under deficient environmental lighting and motion pictures not playable due to long reaction time of the display layer still remain to be fixed.

In view of these problems, the present invention proposes a novel display architecture, which has versatile functions—not only able to show magnified static images or dynamic images, but also able to access the web sites on the internet, providing an immediate channel for users to enquire information.

SUMMARY OF THE INVENTION

One objective of the present invention is to disclose a projection electronic book, which possesses the function of displaying static images and/or dynamic images by integrating a micro projector device and a reflective electronic book together.

Another objective of the present invention is to disclose a projection electronic book, wherein users can click an icon displayed on an electronic book, representing a web site address, to access the web site and display dynamic web images or static web images via a micro projector device, and/or display static web images via the electronic book.

To accomplish the foregoing objectives, a projection electronic book is proposed, the projection electronic book having: an electronic paper device, used for displaying an image on an electronic paper panel according to an image information received via an electronic paper input port; a control unit, having an audio/video input port, a first display output port and a second display output port, the audio/video input port being used to receive a video information and/or an audio information, the video information being output via the first display output port or the second display output port, and the first display output port being coupled to the electronic paper input port; an audio/video storage unit, coupled to the audio/video input port to supply the video information and/or the audio information; and a micro projector, coupled to the second display output port for receiving the video information, being used to project an image according to the video information.

The present invention offers the following advantages:

1. The display content of the electronic book of the present invention can be viewed by multiple persons simultaneously for occasions like conference briefing, photos sharing, reading sharing, etc.
2. The display area of the electronic book of the present invention can be magnified by projection.
3. The electronic book of the present invention can display motion pictures by projection.
4. The electronic book of the present invention can display the content by projection when environmental lighting is deficient.
5. The electronic book of the present invention can access the web sites on the internet to immediately fulfill users' need for information enquiring.

To make it easier for our examiner to understand the objective of the invention, its structure, innovative features, and performance, we use a preferred embodiment together with the accompanying drawings for the detailed description of the invention.

BRIEF DESCRIPTION OF THE DRAWINGS

FIG. 1 is a block diagram of a projection electronic book according to a preferred embodiment of the present invention.

DETAILED DESCRIPTION OF THE PREFERRED EMBODIMENTS

The present invention will be described in more detail hereinafter with reference to the accompanying drawings that show the preferred embodiment of the invention.

Please refer to FIG. 1, which shows a block diagram of a projection electronic book according to a preferred embodiment of the present invention. As shown in FIG. 1, the projection electronic book has an electronic paper device 100, a control unit 110, an audio/video storage unit 120, a micro projector 130 and a speaker 140.

The electronic paper device 100 has an electronic paper panel 101 and a touch module 102. The electronic paper panel 101 has an electronic paper input port to receive image information, and a panel to display an image according to the image information. The touch module 102 sends out a touch sensing signal via a touch interface.

The electronic paper panel 101 is for example but not limited to touch electrophoresis display, MEMS (Micro Electro Mechanical System) display, cholesteric liquid crystal display, electrowetting display, or liquid crystal display, and the electronic paper input port is preferably a USB (Universal Serial Bus) connection port.

The touch module 102 is for example but not limited to resistive touch module, capacitive touch module, optical touch module, surface acoustic wave touch module, or force sensing touch module.

The control unit 110 is preferably a central processing unit (CPU)—used to perform a software program—based control circuit, having an audio/video input port, a first display output port, a second display output port, an audio output port, a touch connection port and a network connection port, wherein the audio/video input port, coupled to the audio/video storage unit 120, is used to receive an audio/video information including a video information and an audio information; the first display output port, coupled to the electronic paper input port of the electronic paper panel 101, is used to output the video information; the second display output port, coupled to the micro projector 130, is used to output the video information; the audio output port, coupled to the speaker 140, is used to output the audio information; the touch connection port, coupled to the touch interface of the touch module 102, is used to receive a touch signal; and the network connection port is used to connect the internet.

The audio/video storage unit 120 is coupled to the audio/video input port of the control unit 120 to output the audio/video information.

The micro projector 130 is coupled to the second display output port of the control unit 130 to project an image according to the video information, wherein the second display output port is for example but not limited to a VGA (Video Graphics Array) output port.

The speaker 140 is coupled to the audio output port of the control unit 110 to broadcast sound according to the audio information.

The projection electronic book of the present invention has the following operation modes:

1. Display images on the electronic paper panel 101 according to the video information from the audio/video storage unit 120: In this mode, the audio/video information from the audio/video storage unit 120 is input through the audio/video input port, and the video information contained in the audio/video information is then output through the first display output port of the control unit 110 to drive the electronic paper panel 101 to display images.

2. Display user's touch input content on the electronic paper panel 101 according to a touch information output from the touch module 102: In this mode, a touch signal from the touch module 102 generated by a touch operation is output through the touch interface, and the touch signal is then input through the touch connection port to the control unit 110. The control unit 110 then outputs corresponding display information through the first display output port to drive the electronic paper panel 101 to display user's touch input content.

3. Project images via the micro projector 130 according to the video information from the audio/video storage unit 120: In this mode, the audio/video information from the audio/video storage unit 120 is input through the audio/video input port, and the video information contained in the audio/video information is output through the second display output port of the control unit 110, and the micro projector 130 then projects images according to the video information.

4. Project user's touch input content via the micro projector 130 according to a touch information output from the touch module 102: In this mode, a touch signal from the touch module 102 generated by a touch operation is output through the touch interface, and the touch signal is then transmitted through the touch connection port to the control unit 110. The control unit 110 then outputs corresponding display information through the second display output port, and the micro projector 130 then projects the display user's touch input content according to the corresponding display information.

5. Display images on the electronic paper panel 101 according to a video information from internet: In this mode, an icon representing a web site address displayed on the electronic paper panel 101 is clicked by a touch pen, and a touch signal from the touch module 102 is output through the touch interface, and the touch signal is then transmitted through the touch connection port to the control unit 110. The control unit 110 then down loads web images information from internet via the network connection port and outputs the web images information through the first display output port to drive the electronic paper panel 101 to display the web images.

6. Project web images from internet via the micro projector 130: In this mode, internet web images information down loaded via the network connection port of the controller 110 is output through the second display output port, and the micro projector 130 then projects images accordingly.

In conclusion, the projection electronic book of the present invention, not only able to show magnified static images or dynamic images when environmental lighting is deficient, but also able to access the web sites on the internet, does improve the reflective electronic books of prior art.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A projection electronic book, comprising:
   an electronic paper device, used for displaying an image on an electronic paper panel according to an image information received via an electronic paper input port, wherein the electronic paper device comprises a touch module having a touch interface;
   a single control unit, having an audio/video input port, a first display output port, a second display output port, a touch connection port, and a network connection port, said audio/video input port being used to receive a video information and/or an audio information, said video information being output via said first display output port or said second display output port, said first display output port being coupled to said electronic paper input port, and said touch connection port being coupled to said touch interface, wherein in one mode that display images on the electronic paper panel according to the video information from internet, an icon representing a web site address displayed on the electronic paper panel is clicked by a touch pen, and a touch signal from the touch module is output through the touch interface, and the touch signal is then transmitted through the touch connection port to the control unit, the control unit then down loads web images information from internet via the network connection port and outputs the web images information through the first display output port to drive the electronic paper panel to display the web images;
   an audio/video storage unit, coupled to said audio/video input port to supply said video information and/or said audio information; and
   a micro projector, coupled to said second display output port for receiving said video information, being used to project an image according to said video information, wherein in another mode that project web images from internet via the micro projector, internet web images information down loaded via the network connection port of the controller is output through the second display output port, and the micro projector then projects images accordingly.

2. The projection electronic book as claim 1, wherein said touch module is one module selected from the group consisting of resistive touch module, capacitive touch module, optical touch module, surface acoustic wave touch module, and force sensing touch module.

3. The projection electronic book as claim 1, wherein said electronic paper device is one device selected from the group consisting of touch electrophoresis display, MEMS display, cholesteric liquid crystal display, electrowetting display, and liquid crystal display.

4. The projection electronic book as claim 1, wherein said micro projector is one projector selected from the group consisting of DLP micro projector and LCOS micro projector.

5. The projection electronic book as claim 1, wherein said control unit further comprises an audio output port.

6. The projection electronic book as claim 5, further comprising a speaker.

7. The projection electronic book as claim 1, wherein said electronic paper input port is a USB connection port.

8. The projection electronic book as claim 1, wherein said second display output port is a VGA output port.

* * * * *